June 5, 1956

R. M. WILCOX 2,748,603

BALANCING MACHINE

Filed May 31, 1950

Inventor
Roy M. Wilcox
by Douglas S. Johnson
atty

June 5, 1956 R. M. WILCOX 2,748,603
BALANCING MACHINE
Filed May 31, 1950 4 Sheets-Sheet 2

Inventor
Roy M. Wilcox
by Douglas S. Johnson
atty

June 5, 1956  R. M. WILCOX  2,748,603
BALANCING MACHINE
Filed May 31, 1950  4 Sheets-Sheet 3

Inventor
Roy M. Wilcox
by Douglass Johnson
Atty.

June 5, 1956  R. M. WILCOX  2,748,603
BALANCING MACHINE
Filed May 31, 1950  4 Sheets-Sheet 4

Inventor
Roy M. Wilcox
by Douglas S. Johnson
atty

United States Patent Office 2,748,603
Patented June 5, 1956

2,748,603

BALANCING MACHINE

Roy Milton Wilcox, Grand Rapids, Mich.

Application May 31, 1950, Serial No. 166,901

13 Claims. (Cl. 73—465)

This invention relates to improvements in balancers for balancing rotating parts, and the principal object of the invention is to provide a balancing machine which will be more sensitive than previous machines in detecting and will present the indications of the unbalance in a part being examined in a more useful manner to the machine operator to indicate immediately and directly its nature, that is, whether static or dynamic or a combination thereof to enable correction to be carried out with more accuracy and facility than in previous machines, greatly reducing the time and cost involved in a balancing operation.

Another important object is to enable the position of unbalance to be indicated directly without recourse to actual measurement around the rotor or modification of the rotor to incorporate an angular scale, and in certain aspects of the invention the elimination completely of any requirement for a reference point on the rotor such as a polished spot or other markings formerly required.

Another object of the invention is to enable a rotatable piece to be balanced while in the balancer, eliminating the time consuming and unsatisfactory operation of handling the piece between a drill press and the balancer for each correction attempt.

Another object of importance is to provide for making measurements of the amount and position of unbalance over a range of speed while maintaining the basis of measurement unchanged to give a correct relative picture of the unbalance over the speed range.

Another important object is to provide for the measurement of amplitude and direction of unbalance for any shape of rotor, many of which cannot be balanced in present machines.

Still another important object is to eliminate masking of unbalance by extraneous sources of vibration and to provide a machine substantially independent of frequency.

The invention has for still another important object the provision of a balancer which, while more accurate, more versatile, and permitting faster balancing, is of more inexpensive, compact and reliable construction than previous machines.

A balancing machine according to the present invention includes a vibration pick-up to detect vibrations caused by a piece being rotated in the machine, means enabling the peak amplitude of the vibration to be related to a reference point associated with the piece and also in its preferred form a means co-related to the indication means for carrying out corrections of the piece while still in the machine.

In one of its most important forms the machine is provided with air bearings affording vibration pick-ups permitting a sensitivity in unbalance detection and accuracy in balancing heretofore unheard of through detection of very small rotor vibrations which create a relatively large change in the extremely thin lubricating air films.

Further, since the air bearing surfaces have no metal-to-metal contact they have no bearing noise and provide an elastic support for the rotor journals so that the customary vibrating bearing cage is unnecessary and the bearings can be rigidly mounted and free of vibration. Thus two sources of extraneous signals which customarily limit balancing accuracy, are wiped out.

One of the main features of the machine resides in the manner of presenting the unbalance vibrations on the screen of a cathode ray tube (C. R. T.) wherein preferably vibrations from opposite ends of the rotating piece are simultaneously presented to indicate immediately the static and/or dynamic unbalance and the direction thereof in the piece and to make immediately evident where correction for the unbalance is most needed.

Another feature according to one aspect of the invention resides in the provision of a rotatable arm or head carrying means for detecting the passage thereby of a reference section of the piece under examination and applying a detection signal at the instant of passage to the C. R. T., and mounting a drill to move longitudinally of the piece and to drill into the piece in fixed angular relation to the vibration pick-ups whereby in a balancing operation the arm is moved angularly to relate the position of the unbalanced mass in a desired angular position beneath the drill spindle relative the vibration pick-ups at the moment the reference section passes the arm, whereby upon the piece being stopped and the reference section brought opposite the arm, drilling can immediately be commenced to remove metal and correct the unbalance without requiring that the piece be removed from the machine and without requiring any angular measurement around the piece in determining the required point of drilling.

The rotatable arm or head is characterized in that it relies upon a change in magnetic field created by the passage of the reference section of the piece modified by incorporating a pin, a hole or other abnormality to alter the magnetic linkage between the piece and head, the magnetic arrangement providing a more economical and reliable reference pulse generator than the polished mirror and photo tube head such as found in United States Patent 2,382,843, August 14, 1945.

It is another feature of the invention to employ a sweep circuit preferably such as disclosed in my co-pending United States application Serial No. 576,419 entitled "Constant Amplitude Auto-Sweep Circuit" and triggered by the detection voltage of the rotatable arm to sweep the C. R. T. while applying voltages from the vibration pick-ups to the C. R. T. to indicate the amplitude, nature or characteristics and angular position of vibration relative the reference section.

With the incorporation of the sweep circuit the variations of the pick-up signals from a pure sine wave indicates the presence of bearing noise, where the rotating piece is balanced in its bearings, and other extraneous vibration sources, permitting a useful and valuable determination of when the piece is balanced within the noise of its bearings so that time is not wasted in attempting to balance below bearing noise. With a constant amplitude sweep as set forth in the above-named application, an angular scale may be employed on the C. R. T. to correctly indicate angular position of the unbalance mass relative the reference section for any speed of rotation. The sweep also provides an accurate tachometer for indicating the speed of the piece.

According to another aspect of the invention the vibration pick-up signal is utilized to directly mark the piece being balanced while the piece is being rotated without recourse to any special design or modification of the piece by employing the peak of the vibration signal to trigger a spark gap discharge discharging to ground through the piece and carrying on discharge to the surface of the piece a marking deposit so that upon stopping the piece it can be immediately drilled as marked to a depth as determined from a calibrated meter responsive to the amplitude of the vibration pick-up signal.

Where the rotatable magnetic head or the spark gap marking is not feasible in certain shapes of rotors, the invention further provides for the accurate indication of the direction of the unbalance relative a reference point by the use of a novel phase meter.

Still another feature is the employment of an air drive to eliminate external vibration effects through the driving of the piece.

A further feature of importance is to incorporate a governor control permitting the speed of the piece to be maintained uniform during test and permitting a frequency or speed run to be made on the piece to determine resonant vibration and to permit step-by-step balancing at increasing speeds as unbalance is reduced by correction to enable the unbalance mass to be progressively decreased to reduce the unbalance within accepted limits.

These and other objects and features will become apparent with reference to the accompanying drawings in which.

In balancing the problem faced is to analyze, describe and correct very small invisible lopsidedness in a body rotating too fast for ordinary examination. It must be rotating because only at high speed is it possible to detect this very small unbalance. The procedure is to measure vibration at two arbitrary points along the axis in an arbitrary direction although the vibration is actually in all directions, and to relate this vibration in an arbitrary direction to a reference point on or associated with the rotor. The measurements at the two arbitrary points have to be co-related into a simple whole description of the unbalance and to do this with scientific certainty, and without a time taking written analysis the measurements must be collected together and presented in a manner intelligible to the operator.

In the readings of unbalance to be sure of what the amplitude readings mean in terms of weight to be removed it is necessary to know that the amplitude read is the unbalance vibration and not some other and that it was not taken too near a critical resonant speed to be sure of what the directions readings mean in terms of the position at which weight is to be removed.

It is necessary in addition to the above to know whether the speed is above or below resonance and whether the angle read is fixed in the neighbourhood of the speed used for if it does not remain fixed then the operator knows that damping or resonance are distorting the reading.

Prior art machines have failed to present this information in a manner to make the unbalance immediately diagnosible without recourse to calculation.

Figure 8:
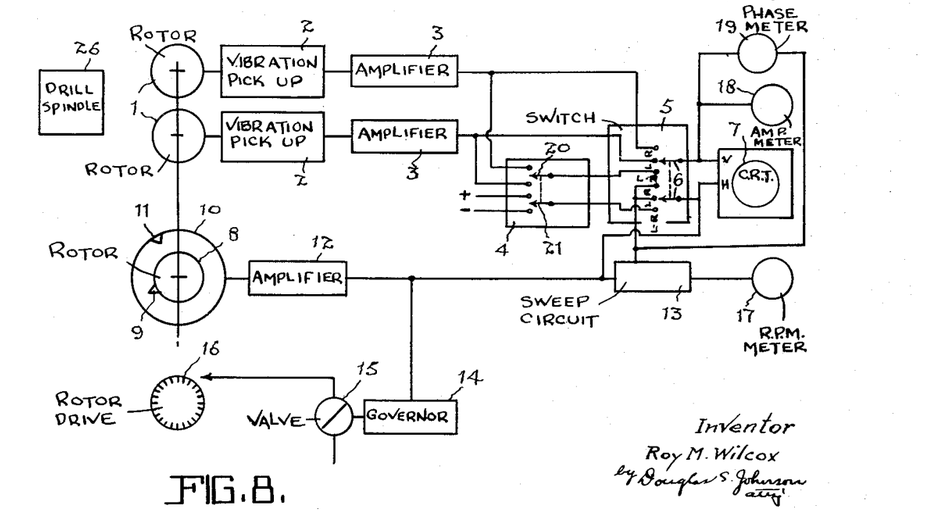
Figure 8 is a schematic block diagram of the machine and associated electrical circuits.
Figure 9:
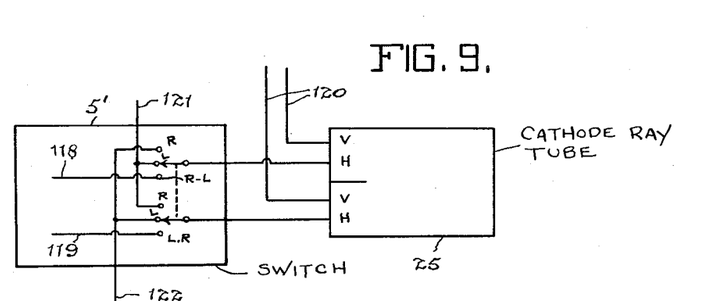
Figure 9 is a block diagram of an alternative arrangement of displaying the information displayed on the cathode ray tube of Figure 8 through the employment of a double beam cathode ray tube, eliminating the necessity for an electronic switch arrangement.

Referring to Figures 8 and 9, an understanding of the machine principles will be evident. The circles marked 1 represent spaced portions of the rotor or piece to be balanced. The blocks 2 are vibration pick-ups which generate a signal corresponding to the amplitude of vibration or displacement of the rotor from its normal position under rotation. Signals from these vibration pick-ups are fed through amplifiers 3 to the electronic switch 4 and also to the multi-contact switch 5, the two poles 6 of which connect to the cathode ray tube 7.

A suitable electronic switch is Sylvania Type 104 although any commercial electronic switch may be employed. The circuit of this type of switch is essentially a pair of gating tubes rendered conductive alternatively by a multi-vibrator to provide the switching action which is well understood in the art.

The inner circle 8 represents a section of the rotor with the pip 9 representing a reference point on or associated with the rotor. The outer circle 10 represents the rotor support mounting with the pip 11 the means of detecting the reference pip 9 passing adjacent thereto to provide a pulse of electrical energy amplified by amplifier 12 and fed to the cathode ray tube and also to the sweep circuit 13 connected with switch 5 and to the governor 14 controlling valve 15 which operates drive 16 connected to the rotor.

Associated with the sweep circuit is an RPM indicator 17 and with the amplified signal from the vibration pick-ups an amplitude meter 18. A phase meter 19 connected with the vibration pick-up signal and a pulse signal from the detector 10, is also shown.

The vibration at any point on the rotor will move the rotor to provide a sinusoidal displacement wave form, resulting in a sinusoidal wave or signal from the vibration pick-ups 2 and this signal is applied to the cathode ray tube through the switches 4 and 5. The pulse from the detector 11 is also fed to the horizontal plates of the cathode ray tube.

With switch 5 in the position marked R it will be seen that the vibration from the one pick-up is applied to the vertical plate of the cathode ray tube, while the sweep circuit signal to sweep the tube is applied to the horizontal plates, so that the wave form of the vibration pick-up signal can be examined for its sinusoidal characteristic.

Variations of sinusoidal form indicate pick-up by the pick-ups 2 of extraneous vibrations other than the rotor vibrations.

Figures 8A, 8B, 8C, 16, 17:
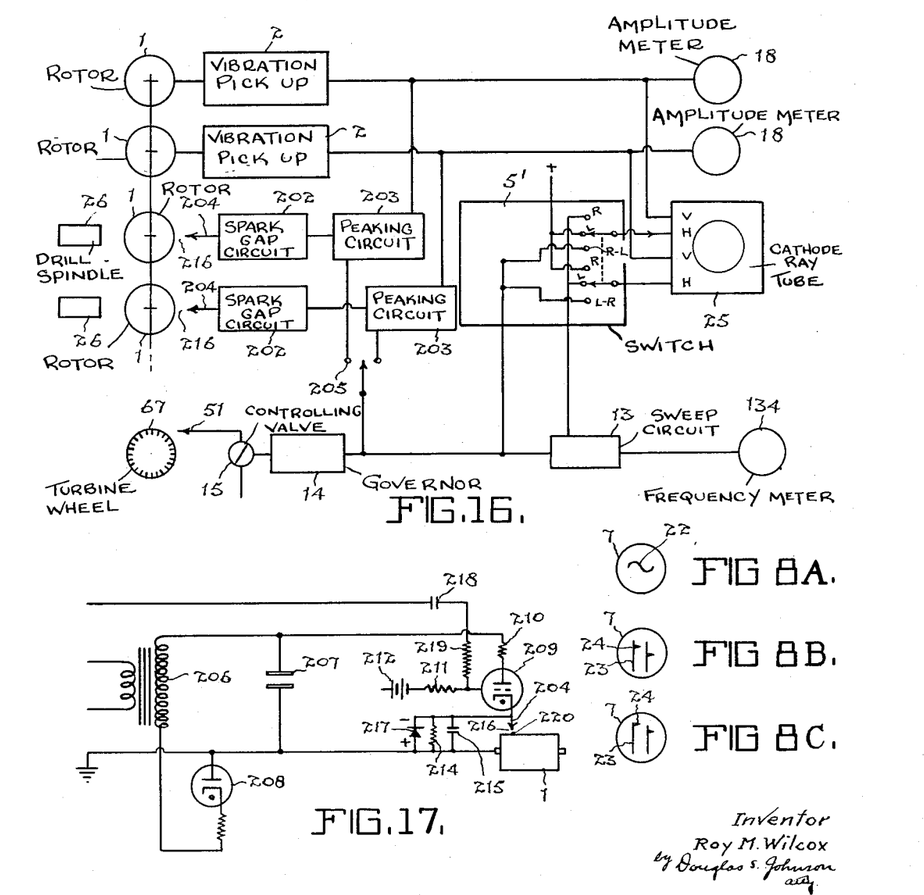
Figures 8A, 8B and 8C are diagram representations of the wave forms obtained on the cathode ray tube for the different positions of the selector switch.
Figure 16 is a schematic block diagram of the machine and associated electrical components wherein the rotatable magnetic direction indicator has been replaced by a spark gap unit to mark the rotor directly in accordance with its vibrations as determined by the vibration pick-ups.
Figure 17 is a schematic wiring diagram of the spark gap unit.

Figure 8A represents the correct vibration displayed in the absence of interfering extraneous vibrations with switch 5 in either position R or L which connects the cathode ray tube in the same manner to the opposite vibration pick-up.

The use of the sweep display permitting the examination of the vibration pick-up signal wave form therefore permits the operator to determine that he is measuring the correct vibration.

With the switch 5 swung to the position marked L—R the cathode ray tube is connected to the electronic switch 4 with the signal from the vibration pick-ups applied to the vertical plates through the upper switch pole 20, while the lower pole 21 connects the horizontal plates to a deflecting potential to separate the vertical traces on the screen of the C. R. T. provided by the signals from the vibration pick-ups.

A pulse from the pulse generator 8—10 is applied to the horizontal plates so that the representation on the screen will appear as in Figure 8B, it being understood that the electronic switch operates with great rapidity in switching from one pick-up to the other, and the cathode ray screen is of the long persistent type.

As opposed to the sinusoidal wave form 22 of Figure 8A the signals from the vibration pick-ups are in the form of vertical traces 23 with the reference pulse in the form of the pip 24.

By having the circle 10 rotatable it will be understood that the phase relation of the reference pulse and the vibration pick-ups can be adjusted so that the pip can be located at the top of one of the vertical traces 23, as illustrated in Figure 8C. The pip will not of course coincide with the top of the opposite vertical trace unless the unbalance is purely static unbalance. Displacement of the pip from the top of the trace indicates the degree of dynamic unbalance, that is, unbalance occasioned not by difference in mass in the rotor but by angular relation between the masses which might balance statically but in motion provide a wobble.

The pictorial presentation on the cathode ray tube immediately presents to the operator the information as to the nature of the unbalance represented by the separation of the pips on the two traces and the magnitude of the unbalance represented by the amplitude of the vertical traces.

While amplitude of unbalance has been measured before on a cathode ray tube, it is believed to be novel in the art to present a side-by-side presentation of unbalance at axially spaced points on the rotor, to indicate the nature of unbalance.

A frequency independent A. C. meter forms the amplitude meter, the reading of which may be calibrated to set stops on a drill spindle as hereinafter described with the meter calibrated in terms of amount of metal to be removed to correct for vibration.

The phase meter 19 hereinafter described forms a means of indicating the direction of the unbalance relative the reference point 9 on the rotor.

In place of the electronic switch 4 and switch 5 a double beam cathode ray tube 25 may be employed with the single switch 5' corresponding to the switch 5. The signals from the vibration pick-ups are applied to the vertical deflecting plates of the separate deflector plate assemblies of the double beam type tube. (Fig. 9.)

The block 26 represents a drill spindle which can be moved axially of the rotor to drill metal from the rotor in balancing without removal from its vibration pick-up mounts.

A fuller understanding of the machine will be had from the following detailed description.

Figure 1:
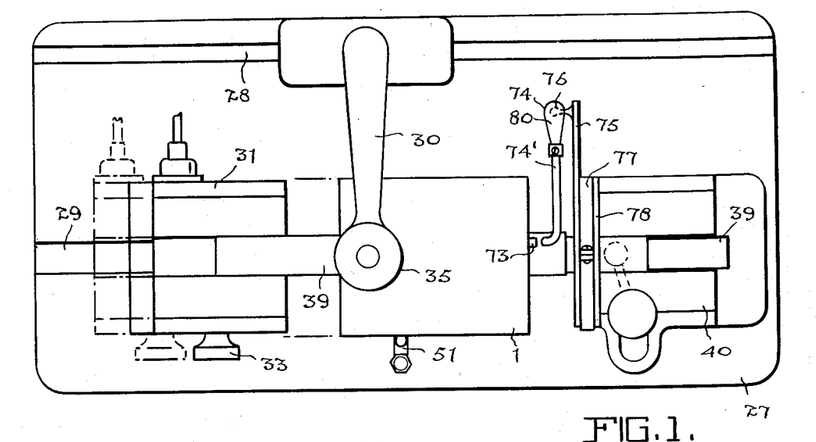
Figure 1 is a plan view of a balancing machine according to the invention.
Figure 2:
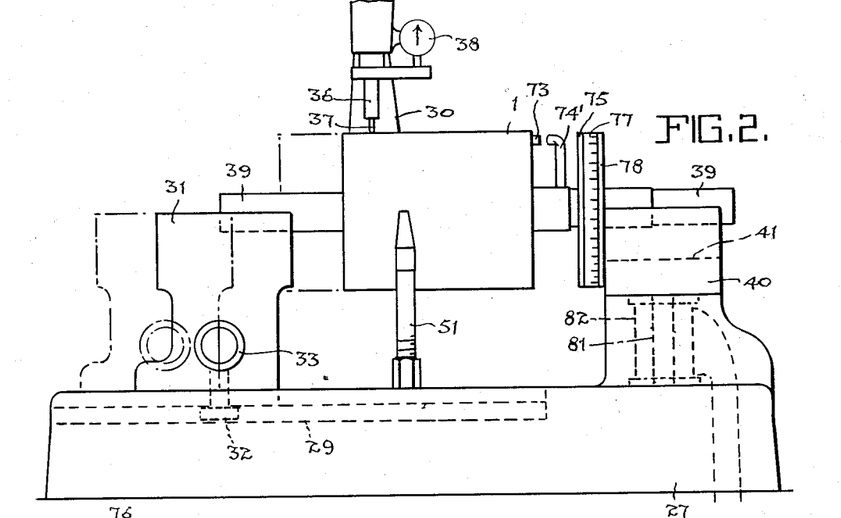
Figure 2 is a side elevational view.
Figure 3:
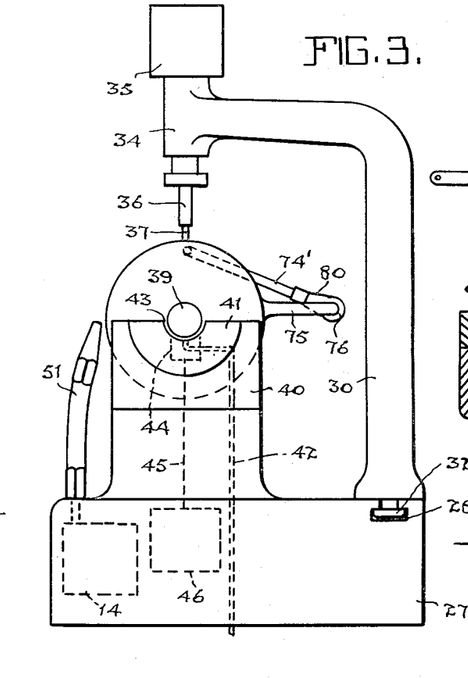
Figure 3 is an end elevational view.

In the form of machine illustrated in Figures 1–3 the base of the machine 27 is provided with a pair of longitudinal T-shaped guide slots 28—29 in which are slidably supported respectively a drill press bracket arm 30 and a bearing carriage 31 each provided with a projecting T-bolt 32 operating in its associated slot and a suitable clamp 33 for clamping the members in adjusted positions in the slots.

Carried on the drill press bracket arm 30 is the drill press 34 comprising drill spindle drive 35, housing 36 and drill 37, including indicator 38 determining depth of drill hole.

The drill is located on a perpendicular axis intersecting the axis of the slot 29 and the rotor 1 supported by its shaft extensions 39 at opposite ends on the bearing carriage 31 and fixed bearing bracket 40 fitting air bearings 41.

Each of the bearing carriage 31 and bracket 40 seats an insulating semi-circular sleeve air bearing 41 of a size corresponding to the size of the particular rotor being balanced.

With reference to Figure 3, it will be seen that compressed air is delivered to the bearing 41 through line 42 in communication with a suitable compressed air source (not shown) to support an air lubricating film 43 in accordance with the teachings of my United States patent applications Serial Numbers 126,757 and 126,758, filed November 12, 1949, now Patent Numbers 2,683,635 and 2,683,636, respectively.

Mounted centrally in the bearing face of each of the insulated sleeve bearings 41 is a conducting plate 44 forming a condenser plate and spanned equally either side of the perpendicular intersecting the axis of the rotor, the opposing condenser plate being formed by the shaft extensions 39.

*Vibration pick up with air bearing*

Figure 10:
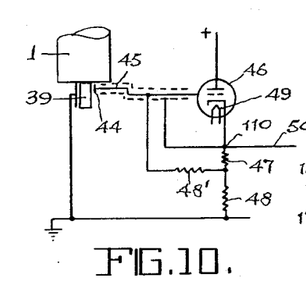
Figure 10 is a schematic wiring diagram of the vibration pick-up where air bearings are employed.

It will thus be seen that the plates 44 and shaft extensions form with the separating di-electric air film 43 a condenser whose capacitance will vary in accordance with the thickness of the air film under the electrical law $$E = \frac{Qt}{KA}$$

where K is a constant A is the area of the condenser plates and Q is the charge between them. By connecting these condensers in the circuit of Figure 10, as hereinafter explained, film variations in accordance with rotor unbalance are indicated by voltage changes effected through the change of capacitance of the condenser. Since the capacitance of the condenser is directly proportional to the thickness of the di-electric $t$ then any percentage change in di-electric thickness will be immediately observed, and as with air bearings the film 43 is extremely thin a small movement of the rotor will be a large percentage change in film thickness giving a large signal, permitting very small unbalance to be detected giving in a balancing machine a sensitivity unheard of in existing machines.

Leading from the plate 44 of each bearing is a shielded conductor 45 feeding signals to the cathode follower circuit of Figure 10. This unit indicated in block form at 46 in Figure 3 is housed within the bearing bracket 40. Referring to Figure 10, the cathode follower includes triode 46 having its plate connected to high tension and its cathode connected to ground through grid bias resistor 47 and cathode resistor 48, permitting cathode to follow grid, being connected thereto through the high impedance resistor 48'. The tube has the usual filament 49 and its grid is connected to lead 45.

The output of the follower taken through lead 50 is a duplicate of the signal generated in the air bearing condenser pick-ups but amplified in current value.

*Air drive*

Normally balancing machines are driven at fixed speeds through a belt drive introducing extraneous vibration sources through the connection of the belt to the rotor. The present machine obviates the above disadvantages by providing an air drive in which a stream of compressed air is delivered from the nozzle 51 mounted on the base of the machine, the stream being delivered from a compressed air supply, not shown, through the control valve of Figure 14 and indicated generally at 15 as operated by the governor circuit of Figure 12 hereinafter described, the valve and governor being indicated in block form in Figure 3.

Figure 14:
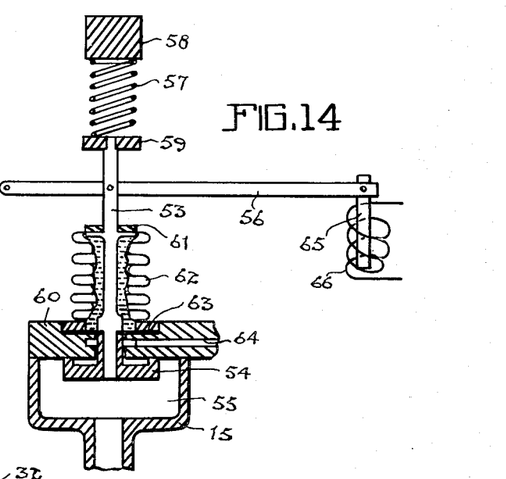
Figure 14 is a mid-vertical sectional view of the air drive control valve controlled by the governor of Figure 12.

For the details of the control valve, Figure 14 shows the valve spindle 53 carrying the valve 54 operating in chamber 55 in communication with the compressed air supply as controlled by the arm 56 and spring 57 engaged between a stop 58 and the head of the valve spindle 59.

Surrounding the spindle between the top wall 60 of chamber 55 and a flange 61 is a liquid-filled frictionless packing 62 with the liquid retained in the packing by the flexible diaphragm 63. The valve is arranged to open and close the passage 64 in the chamber wall communicating with the nozzle 51.

Figures 11, 12:
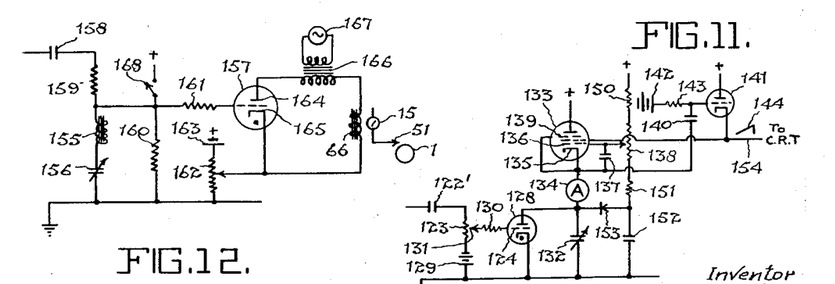
Figure 11 is a wiring diagram of the sweep circuit employed with the cathode ray tube.
Figure 12 is a wiring diagram of the governor device for controlling the air drive employed.

The arm 56 is connected with the armature 65 on the electro-magnet 66 controlling valve position and connected in the circuit of Figure 12.

Figure 3A:
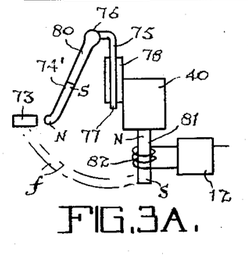
Figure 3A is schematic diagram of the rotatable magnetic direction indicator unit.
Figure 4:
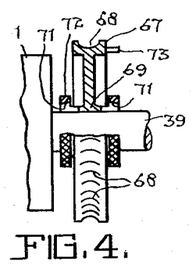
Figure 4 is a side elevation of a turbine wheel which may be employed in the drive of the rotating piece.
Figure 5:
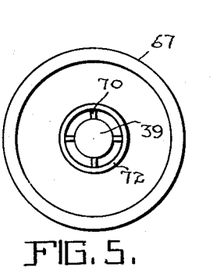
Figure 5 is an elevational view of the turbine wheel at right angles to Figure 4.

In the illustrations Figures 1 to 3, the nozzle 51 is seen directing an air jet against the rotor 1. Some auxiliary means may be employed to bring the rotor up to speed but if the rotor is slotted, as for instance in an armature, the air jet will provide a positive drive, quickly bringing the rotor up to and maintaining the desired speed as controlled by the valve in combination with the governor.

Where the rotor is smooth and also where it is not desirable to provide any reference point on the rotor for balancing, a separate turbine wheel is employed, for example the turbine wheel 67 of Figures 4 and 5. The wheel 67 is mounted on the shaft 39 of the rotor 1 and is provided with "buckets" 68 at its periphery against which the air jet is directed to drive the rotor. The turbine wheel is an accurately balanced wheel and has its hub 69 slotted at 70 and provided with a tapered threaded portion 71 on which collars 72 correspondingly tapered and threaded are received to contract the hub about the shaft 39 without displacing the turbine wheel off centre. Where the turbine wheel is employed then the means of establishing a reference point on the rotor are provided on the turbine wheel so that the rotor does not need to be modified in any manner, the means in the case illustrated being the reference pin 73, the function of which will be hereinafter described in connection with the description of the magnetic direction indicator illustrated diagrammatically in Figure 3A.

R. M. D. I. Unit

The vibration pick-ups measure vibration in an arbitrary direction, with the vibration pick-up formed by the rotor and condenser plates 44 being perpendicular.

To determine the direction of the unbalanced weight causing the vibration it must be related to some point on the rotor. This relation in the machine of Figures 1 to 3 is obtained through the use of the rotatable magnetic direction indicator (R. M. D. I.) unit which comprises a soft iron probe 74 coupled to an arm 75 by a ball and socket joint 76, with the arm 75 being mounted on a ring 77 rotatable on a stationary ring 78 carried by the fixed bearing 40 and coaxial with the rotor axis.

The probe preferably comprises a magnet 74' slidable in a tube 80 so that its length is variable. The probe is swung on its joint 76 and extended as required to a position adjacent a magnetic pin 73 located on the rotor or on the turbine wheel where the turbine wheel is employed so that the rotor in rotation brings the pin adjacent the probe tip.

The bearing 40 is of iron forming a magnetic coupling with the probe and connecting the probe with a permanent magnet core 81, Figure 3A, surrounded by the coil 82 connecting the magnetic circuit with the amplifier 12. The magnets 74' and 81 are marked N—S in Figure 3A, and the linkage through the magnetic circuit is formed by the probe ring 77, bearing mount 40 and magnet 81 with the rotor pin 73, as indicated by the flux lines $f$. It will be seen that the passage of the pin past the probe will disturb the magnetic field, providing a change in the magnetic core flux 81 to provide a signal pulse from the amplifier 12. Thus the probe 74 responsive to magnetic changes and its associated magnetic circuit and amplifier 12 constitute a pulse generator, with the pin 73 forming a means for relating generation of the pulse, that is a release of the pulse energy, with a point on the rotor.

The magnetic field in the R. M. D. I. unit is intentionally weak so that there is negligible attraction between the reference pin and the probe. A pulsating force exerted on the rotor would produce inaccuracies in the readings of unbalance. For this reason the amplifier 12 is required.

The time relation between the occurrence of the pulse from the R. M. D. I. relative the peak amplitude of the rotor vibration, as detected by the vibration pick-ups and displayed on the cathode ray tube 7, is controlled by rotating the ring 77 so that the pips 24, Figure 8C can be aligned with the one pip on the cathode ray tube coinciding with the top of the vertical trace 23 from one of the pick-ups which represents the peak of the amplitude of the vibration pick-up signal, so that the operator will know that the instant the pin 73 is passing the probe 74 the rotor is displaced farthest from the air bearing 41 indicating that the unbalancing mass at that instant is directly above the condenser plate 44 on the side of the rotor remote therefrom. Thus the rotatable mounting of the probe 74, that is the arrangement of the rings 77 and 78, forms a means for relating the generation of the pulse generator to the vibration mode of the rotor to effect a release of pulsed energy therefrom coincident with an amplitude peak of one of the signals or pips 24.

Drill Spindle Unit

Previous machines have required the rotor to be removed for balancing once the unbalancing mass has been located. The drill spindle unit provided in the instant machine permits correction for unbalance to be carried out without removal of the rotor. As explained, the axis of the drill 37 is vertical and intersects the axis of the rotor. Thus the drill is aligned in the direction of vibration measurement, and by setting the R. M. D. I. unit so that the pip 24 corresponds with peak of the vertical trace 23 at the end of the rotor to be corrected then upon stopping the rotor with pin 73 under probe 74 the unbalancing mass is directly under the drill which is then operated to drill the rotor and the drill may be set to drill to a depth corresponding to the amplitude of the vibration signal determined from the meter 18, Figure 8.

Figures 6, 7:
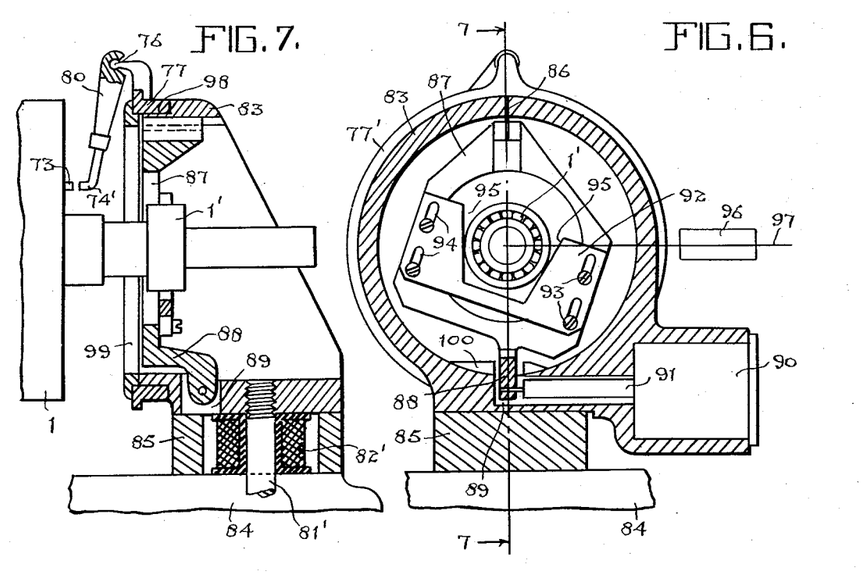
Figure 6 is a transverse vertical sectional view through a modified rotor mounting for balancing rotors in their bearings.
Figure 7 is a vertical section taken on the line 7—7 of Figure 6.

Mechanical rotor and bearing mountings

Where rotors are to be balanced in their own bearings the air bearings 41 are replaced by the mechanical vibration pick-ups illustrated in Figures 6 and 7. The "mechanical" vibration pick-ups do not permit the extreme balancing sensitivity obtainable with the air bearing vibration pick-ups but may be used within the spirit of the invention to permit the immediate indication of location and nature of the unbalance through the arrangement of the cathode ray tube 7 or 25, Figures 8 and 9 and associated circuits.

As shown in Figures 6 and 7, the rotor mounting includes a ferro magnetic trunnion bracket 83 mounted on the bearing mount 84 which may be either the fixed bearing mount or in the nature of the bearing carriage 31. The ring 83 is spaced from its mounting 84 by the non-magnetic spacer 85.

Suspended from the ring bracket 83 on a flexible metal hinge strip 86 is a bracket 87 having a bracket extension 88 projecting into a slot 89 in ring 83 and connecting the suspended vibrating bracket 87 with a vibration pickup device 90, which may be of any suitable kind, housed in bracket 83 through the coupling 91.

Mounted on the vibrating bracket 87 is an adjustable rotor mounting bracket 92 located by clamp screws 93 operating through slots 94. This rotor mount has tapering inner walls 95 to receive any size of rotor wedged therebetween, and the bracket is so oriented that the one wall is vertical so that a drill spindle 96 (shown in block form only) can be operated to drill on a horizontal axis 97 in the direction of vibration measurement and against a supporting surface for the rotor which is perpendicular thereto.

In such a mounting as described the rotor is balanced in its bearing races 1' so that the unit vibrations are reduced to desired value.

The bracket 83 is provided with an R. M. D. I. unit similar to that described and arranged to rotate in the groove 98 of bracket 83 held in position by ring 99.

The rotor 1 creates each revolution a magnetic flux change in the vicinity of the probe 74' through pin 73 (or alternatively a hole could be drilled in the rotor in place of the pin) and as before the probe is linked through the ferro magnetic material of the supporting bracket 83 with the magnetic core 81' of the coil 82' to cause a voltage change in the coil which may be amplified as desired. In the form illustrated the magnetic core 81' is a threaded member serving to retain bracket 83 in position.

By means of the reference signal from probe 74' and a reference signal from vibration pick-up 90 the rotor may be stopped with its unbalancing mass in the direction of vibration pick-up measurement, that is, horizontal, and in direction with the drill, and the drill operated to remove metal from the motor, the bracket 87 under drilling abutting the shoulder 100 formed on bracket 83 during drilling.

As the form of vibration pick-up, that is, the flexibly supported rotor mounting bracket 87 and vibration pick-up 90 are old in the art, no claim is made thereto and further details are not deemed required.

Where the air bearings are used the variation in thickness of the film 43 may be utilized to modulate a capacitance or reluctance circuit as will be understood, and in the form shown wherein the film variation is arranged to provide a changing capacitance between the rotor and plate 44 the circuit connection of the cathode followers employed are illustrated in Figure 10, as described above.

Variations in capacitance are applied from the cathode to the amplifier 3 between cathode connection 110 and ground, the output being a current amplified signal having the sinusoidal wave form corresponding to the vibration wave form and at the same voltage as generated by the pick-up.

Where the electronic switch is used to display alternatively signals from the two vibration pick-ups with the position of switch 5 in L—R, Figure 8, the outputs of the two amplifiers 3 are connected to one of poles 20—21 of the switch, while the other ganged pole is connected alternatively between a plus and minus voltage to provide a separation of the traces produced on application of the signal voltages from the amplifiers.

Figure 15:
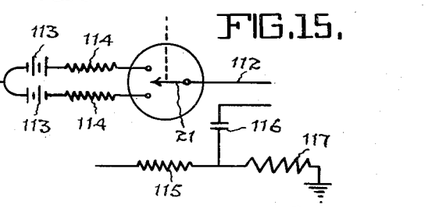
Figure 15 is a schematic wiring diagram of one pole of an electronic switch employed with the single beam cathode ray tube of Figure 8 to couple the required D. C. beam and reference value to C. R. T.

As the electronics of switching tubes are common in the art, one pole or arm 21 of the tube is represented diagrammatically only in Figure 15 in which the lead 112 is a connection to the customary push-pull amplifier necessary for driving the C. R. T. plates and the voltage sources 113 connected in opposite polarity are biases to swing the trace left and right, and the resistors 114 form the coupling to the tubes of the switching devices represented by the pole 21.

Associated with the electronic switch for applying the reference pick-up signals to the cathode ray tube is the circuit, Figure 15, coupling the reference pulse from the R. M. D. I. unit to the C. R. T. comprising the coupling resistor 115 and the coupling condenser 116 connected between 115 and signal dividing resistor 117, condenser 116 being connected to the horizontal plates of the cathode ray tube.

Where the more expensive installation of the double beam cathode ray tube of Figure 9 is employed the electronic switch is dispensed with and the reference pulse from the R. M. D. I. unit is applied through leads 118 and 119 to the horizontal plates of the tube. Leads 120 connect with the vibration pick-up amplifiers 3, while lead 121 connects with a suitable voltage source to deflect the one beam off the screen when not needed. Lead 122 connects with the sweep circuit of Figure 11. With switch 5' in position R a wave form corresponding to Figure 8A is seen for one vibration pick-up signal. Similarly in position L the other vibration signal is seen. In position L—R wave forms corresponding to 8B or 8C are illustrated, depending on the position of the R. M. D. I. unit.

*Sweep circuit*

The sweep circuit indicated by block 13 is useful regardless of speed, degree of accuracy or size of rotor. The sweep, C. R. T. and governor 14 together allow the set-up man to make a "frequency run" of a new rotor to determine speeds comparable with the unbalance to be corrected and to discover stray resonance, the rotor's critical speed, defective bearings causing spurious meter readings, phase shift and other disturbing factors. It provides a means of adjusting the amplitude of vibration in conjunction with the governor to give large and therefore accurate readings without exceeding the capacity of the pick-up and meter scale 18 and also determine the presence of resonant vibrations of parts of the balancing machine especially at high frequency. The sweep and governor also permit a determination of both the bearing noise and unbalance vibration, as the vibration pick-ups respond to every tiny detail of each vibration wave and by the repetition record on the cathode ray tube these details can be detected, observed and corrected.

This correct presentation of what is being balanced is new as far as I am aware in balancing machines and is an important step forward in the art.

With reference to Figure 11, the sweep circuit employed has the characteristic of applying a constant amplitude sweep voltage to the cathode ray tube independent of frequency to give a constant basis of indication and measurement of the vibration pick-up signals on the cathode ray tube.

The sweep also has the characteristic of operating at a frequency synchronized to rotor speed, being triggered by the reference pulse from the R. M. D. I. unit fed through coupling condenser 122' and across a potentiometer 123 to the grid 124 of the thyratron 125 to raise the grid of the thyratron above its bias 129 to permit the tube to fire.

A grid current limiting resistor 130 is connected between tap 131 of the potentiometer and the grid. Connected in parallel with the thyratron 128 is the sweep condenser 132 charged through the constant current pentode 133 with a milliammeter 134 connected between cathode 135, and the sweep condenser acting as a frequency meter as will hereinafter appear.

The grid 136 of the pentode is connected by the condenser 137 to the cathode and to the amplitude control potentiometer 138. A suppressor 139 is also tied to the cathode which is connected through condenser 140 to the grid of the cathode follower 141.

Resistors 150—151 are voltage dividers, while condenser 152 connects 151 to ground for A. C. signals.

Connected between charging condenser 132 and 151 is a rectifier 153.

The plus signs indicated in Figure 11 represent the connections to a voltage source.

The operation of the sweep circuit is dependent upon the constant current characteristic of a pentode wherein the plate current is independent of plate voltage. The operation of the circuit is triggered by a pulse from the R. M. D. I. unit onto the grid of 128 which fires, discharging the sweep condenser 132.

Pentode 133 because of its plate current characteristic is continually charging the sweep condenser at a fixed rate determined by its grid bias, and this grid bias is varied by the amplitude of the saw tooth wave generated on charge and discharge of the sweep condenser.

The average grid voltage of 133 in respect to ground is fixed by the voltage divider 150, 138 and 151, rectifier 153 and the discharge voltage of thyratron 128 (which is the minimum of the saw tooth wave in respect to ground). The average grid bias of the pentode is thus determined by the average of its cathode in respect to ground. Since the sweep is linear this cathode average is one half of the sweep amplitude voltage plus the cathode minimum voltage which is essentially fixed in respect to ground. Thus the cathode average and thus the grid bias depend essentially on the sweep amplitude. This grid bias in turn regulates the charging current in such a way as to correct changes in sweep amplitude, for should the amplitude of the sweep decrease the cathode average voltage would decrease, decreasing the average grid bias, increasing the charging current in compensation.

In reverse, for instance, where the frequency of the pulses arriving to trigger the thyratron from the R. M. D. I. is lowered by decreasing rotor speed, the amplitude of the sweep will tend to increase due to increased charging time for the sweep condenser but the increase in amplitude will raise the average cathode voltage of tube 133 to increase the average grid bias and lower charging current.

The rectifier 153 maintains the voltage of condenser 152 at the sweep minimum determined by thyratron 128, and thus the pentode grid 136 is actually fixed in respect to the sweep minimum instead of ground, thus making the amplitude control through potentiometer 138 independent of variations in the thyratron.

Sweep linearity is insured through condenser 140 and cathode follower 141. The voltage dividing resistances 150—151 and condenser 140 offer high impedance so that the instantaneous pentode grid voltage is determined by its cathode and is hence relatively constant so that the charging current is constant and the sweep linear. However, this is only so if the screen voltage in respect to the cathode is also constant.

Cathode follower 141 supplies the screen current as follows:

The instantaneous sweep voltage is transmitted through condenser 140 to the grid of 141 and 141 is without plate resistance so that its cathode and the screen of the pentode 133 follow its grid. Bias 142 determines the pentode's average screen voltage, and resistor 143 allows the instantaneous variations of the grid voltage of 141 as described above. Milliammeter 134 measures the charging current, thereby indicating sweep frequency as follows:

Since the sweep voltage is linear and constant in amplitude by trigonometry the slope of the sweep wave 144 is proportional to frequency, and since this slope is the rate at which sweep condenser 132 is being charged the current through meter 134 is proportional to sweep frequency, which is proportional to the frequency of the input triggering pulses to thyratron 128, which is proportional to the speed of the rotor 1.

The saw-tooth wave form 144 of constant amplitude is then applied to the horizontal plates of the cathode ray tube when desired to sweep the cathode ray tube at a sweep frequency corresponding to the speed of the rotor and of a constant amplitude to display the signals from the vibration pick-ups so that the presence of extraneous vibrations may be detected.

Governor

As previously explained, to provide for progressively increasing balancing the rotor is first run at a relatively low speed so that the vibration pick-ups will not be overloaded, and as balancing continues the speed is increased. This arrangement has the additional advantage of enabling unbalance due to resonance to be detected. During measurement of unbalance the speed of the rotor must also be accurately controlled. Air provides an infinitely variable speed drive without influencing the unbalance wave, and in the illustrated machine the air drive is through the nozzle 51 as controlled by valve 15 (represented diagrammatically only in Figure 12) which is operated by electromagnet 66.

The circuit of Figure 12 controls current flow in electromagnet 66 and this circuit comprises a variable resonant circuit formed by inductance 155 and variable capacitance 156 connected across the grid of thyratron 157.

A signal from the R. M. D. I. unit is applied to the grid of 157 through coupling condenser 158 and voltage dividing resistor 159.

Paralleling the variable resonant circuit formed by 155 and 156 is grounding resistor 160, while 161 is an isolating resistor.

Tube 157 has its cathode connected to a variable voltage divider 162 connected with a positive grid bias supply 163. Connected between the plate and cathode 164—165 is transformer 166 connected to an alternating current supply 167 and having in series with the secondary winding thereof the electromagnet 66.

Switch 168 connects grid of 157 to a positive voltage to operate the tube when desired.

At series resonance the reactance of 155 and 156 is substantially zero, therefore when pulses arrive from the R. M. D. I. unit through coupling condenser 158 little voltage is generated across the grid 157 as the voltage drop will appear across resistor 159. If the frequency of the pulses from the R. M. D. I. unit are above or below resonance of the resonant circuit 155—156 then the reactance of this circuit will provide a voltage at the grid of 157 to alter current flow through transformer 166 and solenoid 66 and below resonance the reactance of the resonant circuit is capacitive, while above it is inductive to apply a voltage leading and lagging respectively relative the reference pulse to the control grid of 157 to give a variation in tube current resulting from the grid voltage and applied plate A.-C. voltage to maintain the rotor speed substantially constant at the resonant frequency of the resonant circuit. By varying condenser 156 a speed run may be carried out.

Phase meter

Figure 13:
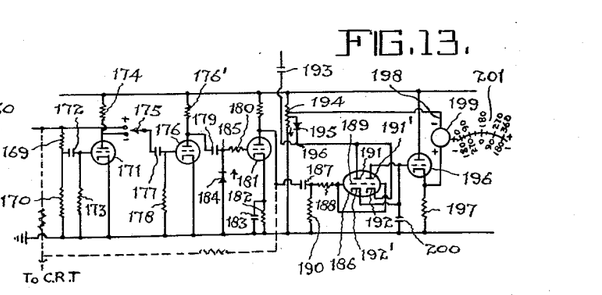
Figure 13 is a wiring diagram of a phase meter for measuring direction and position of unbalance where the rotor shape does not permit use of the rotatable magnetic direction indicator.

In certain instances the R. M. D. I. unit may not be employed and the phase meter of Figure 13 is provided to measure the phase relation between the vibration wave due to unbalance and the signal pulse from the reference point on the rotor. In this circuit the signal from the vibration picked up is applied across voltage dividers 169—170 to the grid of inverter tube 171 through grid coupling condenser 172 and resistor 173. Tube 171 is a triode employing plate resistor 174 across which appears a signal of precisely the same wave form as the input signal but 180° out of phase therewith. 175 is a switch to select the output from tube 171 or coupling directly with the vibration pickup to select the phase of the signal to be peaked by triode 176.

The selected signal is fed to the grid of the triode 176 through grid coupling 177—178 with tube 176 biased to cut off all but positive voltage peaks of the signals applied to the grid thereof, resistor 178 providing an automatic grid bias.

The amplified positive peak of a signal applied to triode 176 appears at the plate of this triode resulting in a plate drop from current flow through plate resistor 176'. This peaked wave form is then applied through coupling condenser 179 and grid current limiting resistor 180 to the grid of triode 181 provided with a cathode bias through resistor 182 and condenser 183.

Rectifier 184 prevents junction 185 between 179 and 180 going beyond ground potential.

Since the signal fed to the grid of triode 181 is the plate drop of triode 176 the signal will have an inverted or negative peak. The bias on the grid of 181 is such that the tube normally conducts until the arrival of the negative peak signal from tube 176, at which time the grid drives the tube into cut-off, raising its plate potential to high tension to provide a positive peak output delivered to sampling tube 186 shown as a double triode through coupling condenser 187 isolating resistor 188 to the two grids 189.

Rectifier 184 limits the value to which the grid of 181 can be driven negative by the signal from 176 to limit cut-off time of 181. Thus through tubes 176 and 181 the positive cycle of the vibration pick-up signal is amplified and peaked so that the output signal from the plate of 181 is a positive pulse coinciding with the very peak of the positive portion of the vibration signal.

The grids 189 of tube 186 are biased through grid leak resistor 190 to normally maintain the tube cut-off until arrival of the pulse from triode 181.

One plate 191 and one cathode 192 are connected through condenser 193 to the output from the sweep circuit appearing across the screen and ground at pentode 133.

Voltage divider 194 and rectifier 195 are provided to maintain the minimum voltage at 196, that is, at the connected plate and cathode 191—192 constant. That is, they are provided to fix the minimum point of the saw tooth wave.

Upon a pulse arriving to swing grids 189 positive the left-hand section of tube 186 conducts, raising the potential of cathode 192' connected to the grid of cathode follower 196. At the same instant that the grid of the left-hand section of tube 186 is positive the grid of the right-hand section is also positive, and with the left-hand section conducting the grid of 196 is raised to permit 196 to conduct, connecting plate 191' with ground through the cathode load resistor 197, permitting the right-hand section of the sampling tube to conduct to apply the voltage appearing at cathode 192 to the grid of the cathode follower 196.

The grid bias for cathode follower 196 is obtained by connecting the cathode through lead 198 to voltage divider 194 at a more positive point than the minimum voltage applied to plate 191 and cathode 192. Connected in this lead is volt meter 199 which measures the voltage rise of the cathode above its bias voltage upon conduction under the application of a signal from the sampling tube 186 to its grid. Condenser 200 serves to smooth the applied signal to the cathode follower.

It will be seen that the voltage appearing across volt meter 199 will depend upon the voltage applied to the grid of the cathode follower which in turn depends upon the voltage applied to plate 191 and cathode 192 of the sampling tube at the instant the pulse is applied to the sampling tube grids 189.

As the voltage at 191 and 192 is saw-toothing in accordance with the output from the sweep generator the voltage applied to the grid of the cathode follower and hence appearing at the cathode thereof will vary in a linear relation from zero when the sampling tube is gated at the beginning of the sweep signal to a maximum when the sampling tube is gated at the end of the sweep signal.

The sweep sawtooth voltage represents one revolution of the rotor and therefore the value of the voltage appearing across volt meter 199 represents an instant during that sweep with zero voltage at the beginning of the sweep and maximum voltage at the end of the sweep, and as the beginning of the sweep represents the passage of the pin 73 past the probe 74 and the voltage indicated by meter 199 represents the lapse of time until peak positive displacement of the vibration pick-up, therefore meter 199 indicates the portion of a revolution between the reference pin and the angular position of the unbalanced portion of the rotor causing the above vibration. Accordingly the meter 199 is calibrated in degrees of angular displacement of the unbalancing mass from the reference pin 73, as illustrated by the scale 201.

Thus through the phase meter 19 and amplitude meter 18 of Figure 8 the direction and amplitude of the unbalance is immediately obtainable.

*Spark gap direction indicator*

According to the foregoing description, a balancing machine includes vibration pick-ups, a means of displaying the amplitude and direction of the vibration at axially spaced planes and a pulsed circuit to provide the reference by means of which the direction of the unbalance or the point of the unbalancing mass is located on the rotor.

Figure 16 represents an extension of this conception of the invention in a modified form. In place of the pulse generator or RMDI unit triggered by the passage of a pin past a probe to provide the reference for locating the direction of the unbalance, spark gap circuits shown in block form 202, Figure 16, are pulsed to mark the rotor 1 directly at the point where the unbalancing mass is located.

All the foregoing advantages with the units described are obtained with the added advantage that the rotor need not be modified in any way, either by the incorporation of a pin or by drilling or by the addition of an angular scale or stroboscope markings.

As illustrated in Figure 16, in this modification of the invention the output of the vibration pick-ups 2, which are the air bearing condenser pick-ups where extreme balancing accuracy is required, or which may be mechanical suspended vibration pick-up arrangement of Figures 6 and 7, is fed to the double beam cathode ray tube 25 being applied to the vertical plates thereof.

Connected with these vibration pick-ups 2 are pulse generators 203 in the form of peaking circuits each of which comprises the circuit formed by the triodes 176 and 181 and their associated circuits, described fully in connection with the phase meter to select and amplify the positive peak of the voltage pick-up signal. These peaking circuits 203 therefore comprise pulse generators capable of converting a sinusoidal wave form into a pulse occurring at the positive peak of the wave form. Because the peaking circuits are connected to the vibration pick-ups 2, it is the vibration wave form which is converted into the pulse and therefore these connections with the pick-ups constitute a means governing the peaking circuits or pulse generators 203 to effect a release of pulsed energy therefrom coincident with the positive amplitude peak of the rotor vibration.

This arrangement avoids the necessity of having to rotate the ring 77 carrying the probe 74 to relate the pulse generator to the vibration amplitude peak, as explained in connection with the RMDI unit and Figure 3A. The pulses or positive peaks are fed from the peaking circuits or pulse generators 203 to the spark gap circuits 202 including a discharge path through electrodes 204 to the rotor to trigger the spark gap circuits to provide a discharge through electrodes 204 to the rotor which is grounded at the instant the peak of the vibration amplitude occurs. The peaking circuits or pulse generators are automatically controlled by virtue of their connection with the vibration pick-ups 2 to provide a pulse related to the vibration mode of the rotor to effect a release of pulsed energy from these pulse generators coincident with the amplitude peaks of the respective signals of the pick-ups. Thus the connections between the peaking circuits and pick-ups 2 form the means controlling the timing of pulse generation for relating the energization of the pulse generators to the peak vibrations of the rotor in place of the mannually operated means formed by the rings 77 and 78 providing adjustment of the probe 74, as illustrated in Figure 7. Thus by connecting the peaking circuits to the vibration pick-ups the operator is relieved of the necessity of rotating the probe 74 to effect pulse release coincident with a vibration amplitude peak.

If the spark gaps are located to discharge in the direction of vibration measurement and the electric discharge to the rotor is arranged to mark or carry a marking medium to mark the rotor surface then this mark will be at the unbalance mass, and to correct for unbalance the rotor is drilled at the mark. Thus the means for marking the rotor forms the means of relating the release of pulsed energy to a point on the rotor in place of the pin 73.

The spark gap discharge however does not have to be in the direction of vibration measurement if the spot on the rotor is brought back to the spark gap electrode 204 when drilling, and the drill is in the direction of vibration measurement. As well, the spot could be brought back to some other point displaced from the spark gap which would allow the drill to be similarly displaced from the vibration pick-ups.

In Figure 16 the outputs of the peaking circuits or pulse generators 203 provide the reference pulse, and as selected by switch 205 are applied to trigger sweep circuit 13 and to operate governor 14 controlling valve 15 feeding air drive to nozzle 51 to drive the rotor directly or through the turbine wheel 67. A sweep circuit is illustrated as incorporating a meter 134 forming the frequency meter.

When the switch 5' is connected to the horizontal plates of the cathode ray tube 25 through either of the contact sets marked R or L the tube will be swept by the sweep frequency from the sweep circuit 13. Then one or other of the vibration signals from the pick-ups 2 will be displayed with the form of Figure 8A depending on whether or not the switch is in the R or L position. For instance, with the switch in the L position, as illustrated in Figure 16, the voltage wave form from the lower pick-up 2 will be displayed while a positive voltage is applied to the horizontal plate of the upper beam of the cathode ray tube to drive it off the screen, and the wave form on the lower beam can be examined for extraneous noise or interference. Similiarly, by moving the switch to the R contact position, the pick-up wave form from the upper signal generator may be examined on the upper beam.

With the switch at the position L—R sweep circuit 13 is cut off from the cathode ray tube and the signal voltages from the pick-ups 2 are employed to sweep the two beams of the cathode ray tube vertically, while the reference pulses from the peaking circuit or reference pulse generator 203 selected by switch 205 are displayed on the vertical sweeps to produce the pattern of Figure 8C. This pattern where the pulse coincides with the peak of one of the vibration signals is inherently produced because of the connection of the peaking circuit 203 with one of the pick-ups 2 whereby it is the peak of the signal from this pick-up which forms the reference pulse as above described.

This pattern of Figure 8C as above explained gives the relative position or direction of the unbalance at the different points on the rotor in a manner which enables immediate diagnosis of the nature of the unbalance so that balancing can be immediately and intelligently carried out.

Figure 17 represents a suitable pulse generating spark gap or discharge circuit that may be employed to produce the pulse discharge across the spark gap 216. In this circuit transformer 206 is arranged to charge condenser 207 through the mercury rectifier 208. Connecting the plate of thyratron 209 with condenser 207 is current-limiting resistor 210 and applied to the grid of 209 through coupling resistor 211 is a negative grid bias 212.

The cathode of 209 is connected to ground through the high resistance leak 214 and condenser 215 which helps to deliver a high instantaneous current to the spark gap 216 between electrode 204 and rotor 1 upon discharge of condenser 207 through the thyratron 209. Rectifier 217 ensures that the plate to cathode potential of 209 be not increased by a negative charge remaining on condenser 215 after an oscillatory discharge. A signal from the peaking circuit 203 is fed to the grid of the thyratron 209 through the D.-C. blocking condenser 218 and coupling resistor 219 as a positive pulse to trigger the thyratron which is triggered as soon as the voltage applied from the peaking circuit elevates the grid beyond the critical grid voltage at which the thyratron ionizes.

The amplitude of the pulse from the peaking circuit and the bias 212 are such as to make sure that the thyratron 209 fires only at the same instant that the pulse occurs. The thyratron need not fire each rotor revolution but its relation to the vibration pick-up signal through the applied peaked pulse is essential.

Once thyratron 209 begins to ionize the grid loses control so that the bias no longer matters and the cathode need not stay at ground potential. The low impedance path for tube current is through spark gap 216 and a high current sustained by storage condensers 215 and 207 vaporize electrode 204 made of colouring conducting material which vaporizes and is carried over to the rotor 1 by electrical attraction, thus leaving a distinct mark on the rotor indicating the angular position of unbalance. A large diameter lead is suitable for the electrode 204. Alternatively the electrode may be a conducting tube housing a colouring material which vaporizes and is carried over to the rotor. With the rotor marked and the electrode 204 located in the direction of vibration measurement a drill drilling in the direction of vibration measurement at the marking will effect a balance correction.

In the foregoing description it will be understood that the filaments and their connections and power supplies in the circuit diagrams have been omitted for the sake of clarity and the high tension voltages and tube connections will be as in standard practice.

*Balancing operation*

The rotor to be balanced is first mounted in the machine on the air bearings 41 where air bearing pickups are employed or in the bracket 87 where the mounting of Figures 6 and 7 is employed. The rotor is then driven at a relatively low speed and switch 5 in Figure 8, or switch 5' in Figures 9 and 16, is set to connect the output of the vibration pick-ups 2 with the vertical plates of the cathode ray tube while sweeping the tube horizontally with the sweep circuit voltage to observe the nature of the waveforms to ensure that rotor unbalance is being measured. This is done with switch 5 or 5' in positions R and L. The switches are then set to the position L—R and the two traces on the cathode ray tube corresponding to Figures 8B and 8C observed.

The relative amplitude of the vertical traces 23 indicates at which end of the rotor the unbalance is greater. Pip 24 is then set at the peak or top of one of the vertical traces either by rotating the RMDI unit to move the pip or selecting the desired vibration through switch 205, Figure 16. The C. R. T. then shows at a glance what type of unbalance has to be corrected and which end to correct first.

In between positions of the pips, e. g., Fig. 8C, shows a combination of static and dynamic unbalance. From the observations of the cathode ray tube the rotor is stopped and drilling commenced at the proper point and adjacent the correct end of the machine with the rotor stopped either with its pin 73 opposite probe 74 or 74' or its marking represented at 220, Figure 17, beneath electrode 204, and the drill press bracket arm 30 slid along the base 27 to the end of the machine to be first corrected or two drill spindles may be provided and operated simultaneously.

The amount of metal removed is determined from the reading of the vibration amplitude from meter 18, and first one end and then the other end corrected.

Governor 14 permits the speed of the rotor to be maintained constant during measurement but also permits the speed of the rotor to be varied as desired. To be sure of what the amplitude readings, either taken roughly from the cathode ray tube or from the amplitude meter 18, mean, in terms of weight to be removed, it is necessary to know that the amplitude read is the unbalance vibration and not some other; that it was not taken too near a critical resonance speed and that the angle of unbalance observed is fixed in the neighbourhood of the speed used. In the event the observations vary in the neighbourhood of the speed used it means that damping or resonance are distorting the reading. It is also necessary to know whether the speed is above or below resonance. By varying the governor the cathode ray tube indicates this information at a glance to the operator, as the operator can see the performance at both ends of the rotor at one point when increasing the speed for the next correction.

When unbalance is corrected to a minimum at the one speed then the speed of the rotor is increased and the increased unbalance vibration observed permits further balancing to be carried out. These steps are repeated until the rotor or rotor and its bearings are balanced to within acceptable limits.

What I claim as my invention is:

1. In a balancing machine, in combination, a pair of signal generating vibration pick-ups generating signals responsive to vibrations of a rotor to be balanced, a pair of pulse generating spark gap circuits each including a spark gap discharge path to said rotor and an electrode forming part of said path to release on discharge colouring matter to mark said rotor, a pair of peaking circuits connected with said vibration pick-ups and peaking signals therefrom and connected with said pulse generating spark gap circuits to trigger same for pulse discharge across said spark gap discharge paths coincident with signal peaks from said vibration pick-ups, a cathode ray tube and circuits applying signals from said vibration pick-ups to one set of cathode ray tube beam control means and pulses from said peaking circuits to another set of cathode ray tube beam control means.

2. In a balancing machine, a pair of spaced bearing surfaces adapted to support a rotor to be balanced, feed passage means for delivering a compressed gas between said surfaces and a rotor supported thereon as an elastic lubricating film, means for driving said rotor, signal generating means disposed at said spaced bearing surfaces and responsive to variations in the separation of said rotor and bearing surfaces under rotor unbalance vibrations, a cathode ray tube, a circuit connecting said signal generating means with a set of deflector plates of said cathode ray tube to sweep said cathode ray tube, an electrical pulse generator, means operatively connected with and controlling the timing of said pulse generator to release a pulse coincident with an amplitude peak of a signal generated by one of said signal generating means, means governed by said pulse generator to provide an identifiable point on said rotor relating the release of said pulse with said point on said rotor, and circuit means connecting said pulse generator to another set of deflector plates of said cathode ray tube as swept by signals from said signal generating means to display said pulse.

3. In a balancing machine, a bearing surface adapted to support a rotor to be balanced, feed passage means for delivering compressed gas between said surface and a rotor mounted thereon as an elastic lubricating film, means for driving said rotor, and means responsive to variations in the separation of said rotor and bearing surfaces under rotor unbalance vibrations generating an unbalance signal.

4. In a balancing machine, a pair of vibration pick-ups for generating voltages responsive to vibrations of opposite ends of a rotor being balanced, means connected with and responsive to the voltage responses of each of said vibration pick-ups for generating a reference signal each rotor revolution coincident with the peak amplitude of rotor vibration, a cathode ray tube and a circuit connecting said vibration pick-ups to deflector plates of said cathode ray tube to sweep said cathode ray tube, circuit means connecting said reference signal generating means to other deflector plates of said cathode ray tube to simultaneously display the reference signal relative the sweeping signals from said pick-ups, and means responsive to said reference signal marking said rotor to provide a reference point related to a point of mass unbalance causing rotor vibration.

5. In a balancing machine, in combination a pair of signal generating vibration pick-ups generating signals responsive to vibrations at opposite ends of a rotor to be balanced, a pulse generator, a discharge circuit including a spark gap discharge path to said rotor discharged by said pulse generator, said pulse generator comprising a peaking circuit connected to one of said signal generating means, means operatively connected with said pulse generator and controlling the timing of said pulse generator to relate generation of a pulse in said pulse generator to the vibration mode of said rotor to effect a release of pulsed energy from said pulse generator to discharge across said spark gap coincident with an amplitude peak of the signal from one of said pick-ups to mark said rotor, and means connected with said vibration pick-ups measuring amplitudes of vibration pick up signals.

6. In a balancing machine, in combination, a pair of signal generating vibration pick-ups generating signals responsive to vibrations of opposite ends of a rotor to be balanced, a pulsed generator comprising a peaking circuit connected with each of said vibration pick-ups and producing a pulse coincident with a signal peak from its respective vibration pick-up, a discharge circuit including a spark gap discharge path to said rotor discharged by each of said pulse generators, and an electrode forming part of said path to release on discharge colouring matter to mark said rotor, and means connected with said vibration pick-ups measuring amplitudes of vibration pick-up signals.

7. In a balancing machine in combination, a pair of spaced signal generating vibration pick-ups generating signals responsive to vibrations of opposite ends of a rotor to be balanced, electrical indicator means in connection with each of said vibration pick-ups and responsive to signals generated thereby, said indicator means being constituted to indicate amplitudes of said signals simultaneously, a pulse generator, means connecting said pulse generator and one of said vibration pick-ups to effect a release of pulsed energy therefrom coincident with an amplitude peak of one of said signals, spark gap means arranged to discharge to a point on said rotor connected with said pulse generator for relating the release of said pulsed energy with said point on said rotor, and means connecting said pulse generator output with said electrical indicator means to display the portion of a rotor revolution between pulses from said pulse generator and an amplitude peak of the other of said signals.

8. A balancing machine, in combination, a pair of signal generating vibration pick-ups to generate signals responsive to vibrations of opposite ends of a rotor to be balanced, a cathode ray tube, circuit means connecting said pick-ups to sweep said cathode ray tube with each pick-up generating a sweep independent of the sweep of the other pick-up, a pulse generator, means connecting said pulse generator and one of said vibration pick-ups for generating a pulse in said pulse generator coincident with an amplitude peak of one of said signals, spark gap means arranged to discharge to a point on said rotor connected with said pulse generator for relating the release of pulsed energy from said pulse generator with said point on said rotor, said pulse generator being in connection with said cathode ray tube to display the pulses of the pulse generator on said cathode ray tube as swept by said vibration pick-ups.

9. In a balancing machine, a pair of vibration pick-ups forming mounting means for rotatably supporting a rotor to be balanced, and generating voltages in proportion to vibration at opposite ends of said rotor, means driving said rotor on said mountings, a pair of voltage generating means each responsive to the voltage responses of one of said vibration pick-ups, each voltage generating means creating a reference signal each revolution of the rotor coincident with the peak amplitude of rotor vibration as determined by its respective vibration pick-up, means responsive to each of said reference signals marking said rotor to provide reference points related to a point of mass unbalance causing rotor vibration, a cathode ray tube, and circuit means connecting said cathode ray tube and applying voltages on the deflector plates thereof from said pick-ups and said reference signal generating means to simultaneously display amplitude of vibration of each end of the rotor.

10. In a balancing machine, a pair of vibration pick-ups forming mounting means for rotatably supporting a rotor to be balanced, generating voltages in proportion to vibration at opposite ends of said rotor, a peaking circuit connected with each of said vibration pick-ups and peaking signals therefrom to provide a pulse output coincident with maximum signal amplitude received from its vibration pick-up, a spark gap discharge circuit connected with each of said peaking circuits, said spark gap discharge circuit being triggered by pulses from said peaking circuit and discharging to said rotor and adapted to mark said rotor adjacent the end supported by the vibration pick-up with which the respective peaking circuit is connected, cathode ray tube means, circuit means connecting each vibration pick-up to said cathode ray tube means to provide a pair of sweeps thereon, and circuit means for connecting the outputs of said peaking circuits to said cathode ray tube means as swept by said vibration pick-ups.

11. In a machine as claimed in claim 10 having means to drive said rotor over a range of speed, said cathode ray tube means providing a continuous indication of vibration characteristics over said speed range.

12. A machine as claimed in claim 10 in which said vibration pick-ups forming mounting means comprises a pair of spaced bearing surfaces to support the rotor adjacent the ends thereof, feed passage means for delivering compressed gas between said surfaces and said rotor as an elastic lubricating film, and means responsive to variations in the separation of said rotor and bearing surfaces under rotor unbalance for generating voltages proportional to such variations in separation.

13. A machine as claimed in claim 10 in which each of said spark gap circuits includes means energized on discharge of said discharge circuit to release a marking medium to be carried by discharge to said rotor.

References Cited in the file of this patent

UNITED STATES PATENTS

| | | |
|---|---|---|
| 1,252,695 | Hopkins | Jan. 8, 1918 |
| 1,491,523 | Ekstrom | Apr. 22, 1924 |
| 1,731,922 | Eaton | Oct. 15, 1929 |
| 1,924,087 | Allen | Aug. 29, 1933 |
| 1,996,063 | Corkran | Apr. 2, 1935 |
| 2,076,944 | Howe | Apr. 13, 1937 |
| 2,165,992 | Westendorp | July 11, 1939 |
| 2,322,561 | Bevins et al. | June 22, 1943 |
| 2,346,975 | Laboulais | Apr. 18, 1944 |
| 2,364,810 | Noxon | Dec. 12, 1944 |
| 2,383,588 | Bousky | Aug. 28, 1945 |
| 2,394,411 | Tolman | Feb. 5, 1946 |
| 2,426,305 | Hope | Aug. 26, 1947 |
| 2,432,659 | Criswell | Dec. 16, 1947 |
| 2,442,308 | Meredith et al. | May 25, 1948 |
| 2,449,429 | Van Degrift et al. | Sept. 14, 1948 |
| 2,492,472 | Fortescue | Dec. 27, 1949 |
| 2,512,154 | Herwald et al. | June 20, 1950 |
| 2,537,902 | Ludwig | Jan. 9, 1951 |